(12) United States Patent
Miesner

(10) Patent No.: US 12,211,646 B1
(45) Date of Patent: Jan. 28, 2025

(54) LINEARIZED PULL-PULL ELECTROMAGNETIC ACTUATORS, SYSTEMS, AND METHODS

(71) Applicant: United States of America as Represented by the Secretary of the Navy, Arlington, VA (US)

(72) Inventor: John E. Miesner, Fairfax, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 178 days.

(21) Appl. No.: 18/297,362

(22) Filed: Apr. 7, 2023

Related U.S. Application Data

(62) Division of application No. 17/142,656, filed on Jan. 6, 2021, now Pat. No. 11,682,513.

(51) Int. Cl.
| H01H 47/00 | (2006.01) |
| H01F 7/06 | (2006.01) |
| H01F 7/16 | (2006.01) |
| H02K 33/00 | (2006.01) |
| H02K 33/12 | (2006.01) |

(52) U.S. Cl.
CPC ........... *H01F 7/1615* (2013.01); *H01F 7/064* (2013.01); *H01F 7/066* (2013.01); *H02K 33/00* (2013.01); *H02K 33/12* (2013.01); *H01F 7/06* (2013.01)

(58) Field of Classification Search
None
See application file for complete search history.

(56) References Cited

U.S. PATENT DOCUMENTS

| 4,631,430 A * | 12/1986 | Aubrecht | H01F 7/1646 310/12.24 |
| 4,656,400 A | 4/1987 | Pailthorp | |
| 5,126,641 A | 6/1992 | Putman | |
| 5,231,336 A | 7/1993 | van Namen | |
| 5,587,615 A | 12/1996 | Murray | |
| 6,774,510 B1 * | 8/2004 | Moro | H04R 9/025 310/12.24 |
| 8,629,569 B2 | 1/2014 | Roberts | |
| 9,390,875 B2 | 7/2016 | Kohlhafer | |
| 10,319,549 B2 * | 6/2019 | Wardle | H01H 45/04 |
| 10,389,197 B2 | 8/2019 | Biwersi | |
| 11,682,513 B1 * | 6/2023 | Miesner | H02K 33/12 335/229 |
| 2005/0052265 A1 * | 3/2005 | Vladimirescu | H01F 7/1615 335/229 |
| 2006/0197388 A1 * | 9/2006 | Kim | H01F 7/1607 310/14 |
| 2014/0354381 A1 | 12/2014 | Kohlhafer | |
| 2016/0181049 A1 * | 6/2016 | Rallabandi | H01F 7/081 335/229 |
| 2017/0256348 A1 | 9/2017 | Thode | |
| 2017/0321620 A1 | 11/2017 | Hutchins | |

* cited by examiner

*Primary Examiner* — Stephen W Jackson
(74) *Attorney, Agent, or Firm* — Dawn C. Russell; Jesus J. Hernandez

(57) ABSTRACT

Electromagnetic actuators are provided, which generate bidirectional linear force output without magnetic bias from current or permanent magnets. Systems and methods based on the electromagnetic actuators are also provided.

5 Claims, 9 Drawing Sheets

LINEARIZED PULL-PULL ELECTROMAGNETIC ACTUATORS, SYSTEMS, AND METHODS

RELATED APPLICATIONS

This application is a divisional of co-pending U.S. application Ser. No. 17/142,656 filed Jan. 6, 2021.

FIELD OF THE INVENTION

The invention provides electromagnetic actuators with bidirectional linear force output, without magnetic bias from current or permanent magnets. Systems and methods based on the electromagnetic actuators are also provided.

BACKGROUND OF THE INVENTION

The present invention relates to actuators generally and, in particular, electromagnetic actuators that produce bidirectional linear force.

Many applications of actuators require a linear response; that is the force output is directly proportional to the signal input. Nonlinearities result in a distorted force output, which includes harmonics of the input frequency.

Electromagnetic actuators, such as variable reluctance actuators, are inherently nonlinear and unidirectional, generating pull force across a gap that is quadratic with respect to the total flux crossing the gap. A common method to achieve bidirectional linear force is to provide two opposing gaps with the total force output equal to the difference in force generated in each gap and then to provide a constant magnetic bias flux in the gaps from either current-conducting drive coils or permanent magnets.

U.S. Pat. No. 5,126,641 to Putman, et al., shows an example of magnetic bias provided by current-conducting drive coils. Two drive coils provide both the magnetic bias across two gaps and the fluctuating magnetic flux that produces the desired output force. The force in each gap is calculated based on the associated drive coil current and the gap width. A feedback controller varies the fluctuating current around the constant bias current based on the calculated force.

U.S. Pat. No. 5,587,615 to Murray, et al., shows an example of magnetic bias provided by permanent magnets. The bias flux from the permanent magnets flows in opposite directions across two gaps. Two current-conducting drive coils provide the fluctuating magnetic flux across the gaps with the drive coil flux being the same direction across the gaps. Therefore, as drive coil flux increases it tends to cancel the bias flux in one gap and add to the bias flux in the other gap.

It should be noted that providing magnetic bias by current-conducting drive coils as taught by Putman, et al., is extremely inefficient, especially when generating wide band forces with a large ratio of peak force to Root Mean Square (RMS) force. The magnetic bias in each gap must be maintained high enough to generate at least one-half of the peak force required. Therefore, high current and power are required even when force output is low. For example, if a peak total force of 1000 Newtons (N) is required, then the bias in each gap must generate a force of at least 500 N so that the force in the gap may vary between 0 and 1000 N. To produce a zero output force in this example, one gap will have a force of 500 N and the other gap will have a force of −500 N. Most of the actuator electrical power is used simply to maintain the bias, rather than produce useful output. The amplifiers, power supply, and overall actuator must be sized to support the magnetic bias requirement.

It should also be noted that providing the magnetic bias by permanent magnets as taught by Murray, while far more efficient than using current-conducting drive coils as taught by Putman, creates a negative stiffness across the air gaps which must be counteracted by positive stiffness elements, such as elastic springs. As the gaps get smaller, the force due to permanent magnet bias increases. If the gap closes to zero width, "lock up" may occur where the restoring spring force is not adequate to free the moving portion from the stationary portion, making the actuator inoperable until this condition is corrected. To avoid lock up, actuators with permanent magnet bias are typically designed with stronger than optimum springs and use only a portion of the available gap. The strong springs reduce the force output and require power to compress, reducing the actuator efficiency. Using only part of the gap reduces low frequency force output.

Accordingly, there remains a need in the art for apparatus and methods that achieve improved electromagnetic actuator performance and efficiency.

SUMMARY OF THE INVENTION

The invention described herein, including the various aspects and embodiments thereof, meets the needs of the art, as well as others, by providing electromagnetic actuators with bidirectional linear force output, without magnetic bias from current or permanent magnets. Systems and methods based on the electromagnetic actuators are also provided.

According to a first aspect of the invention, an electromagnetic actuator includes: a shaft having an axis; an axial bearing; a coil assembly including an inner flux cylinder, an outer flux cylinder, top and bottom electrical coils located radially between the inner and outer flux cylinders, a center flux return located radially between the inner and outer flux cylinders and axially between the top and bottom electrical coils, all moving coil assembly components being joined to move as a unit; top and bottom stationary flux returns that support the shaft, the top and bottom stationary flux returns radially aligned with the inner and outer flux cylinders to form top and bottom axial air gaps; and top and bottom magnetic flux sensors positioned to measure magnetic flux crossing the respective top and bottom axial air gaps.

According to another aspect of the invention, a force linearization and control system includes: a crossover controller receiving commanded output force as input and producing top and bottom gap force commands; top and bottom squaring circuits receiving inputs from the respective top and bottom magnetic flux sensors and producing calculated top and bottom force estimates; top and bottom gap force controllers receiving calculated top and bottom gap force estimates from the respective top and bottom squaring circuits and receiving top or bottom gap force commands from the crossover controller and producing top and bottom current commands; and an amplifier receiving top and bottom current commands from the top and bottom gap force controllers and producing corresponding electrical currents in the respective top and bottom electrical coils.

According to a further aspect of the invention, a method is provided for producing bidirectional linear force output from an electromagnetic actuator without magnetic bias from current or permanent magnets, and includes: providing an electrodynamic actuator with top and bottom magnetic flux sensors positioned to measure magnetic flux crossing respective top and bottom axial air gaps; squaring the measured flux from the top and bottom magnetic flux sensors and multiplying by a proportionality constant to obtain an estimate of force produced across the top and bottom axial air gaps; calculating top and bottom axial air gap force commands according to a crossover algorithm; and controlling current through top and bottom electrical coils, causing the estimated axial force produced across the top and bottom axial air gaps to be equal to the top and bottom axial air gap force commands.

The apparatus, systems, and methods of the invention achieve improved electromagnetic actuator performance and efficiency by providing an actuator that does not require magnetic bias from current or from permanent magnets.

Other features and advantages of the present invention will become apparent to those skilled in the art upon examination of the following or upon learning by practice of the invention.

BRIEF DESCRIPTION OF THE DRAWINGS

The present invention will now be described, by way of example, with reference to the accompanying drawings, wherein like numbers indicate same or similar parts or components, and wherein.

DETAILED DESCRIPTION OF EXEMPLARY EMBODIMENTS OF THE INVENTION

Figure 1:
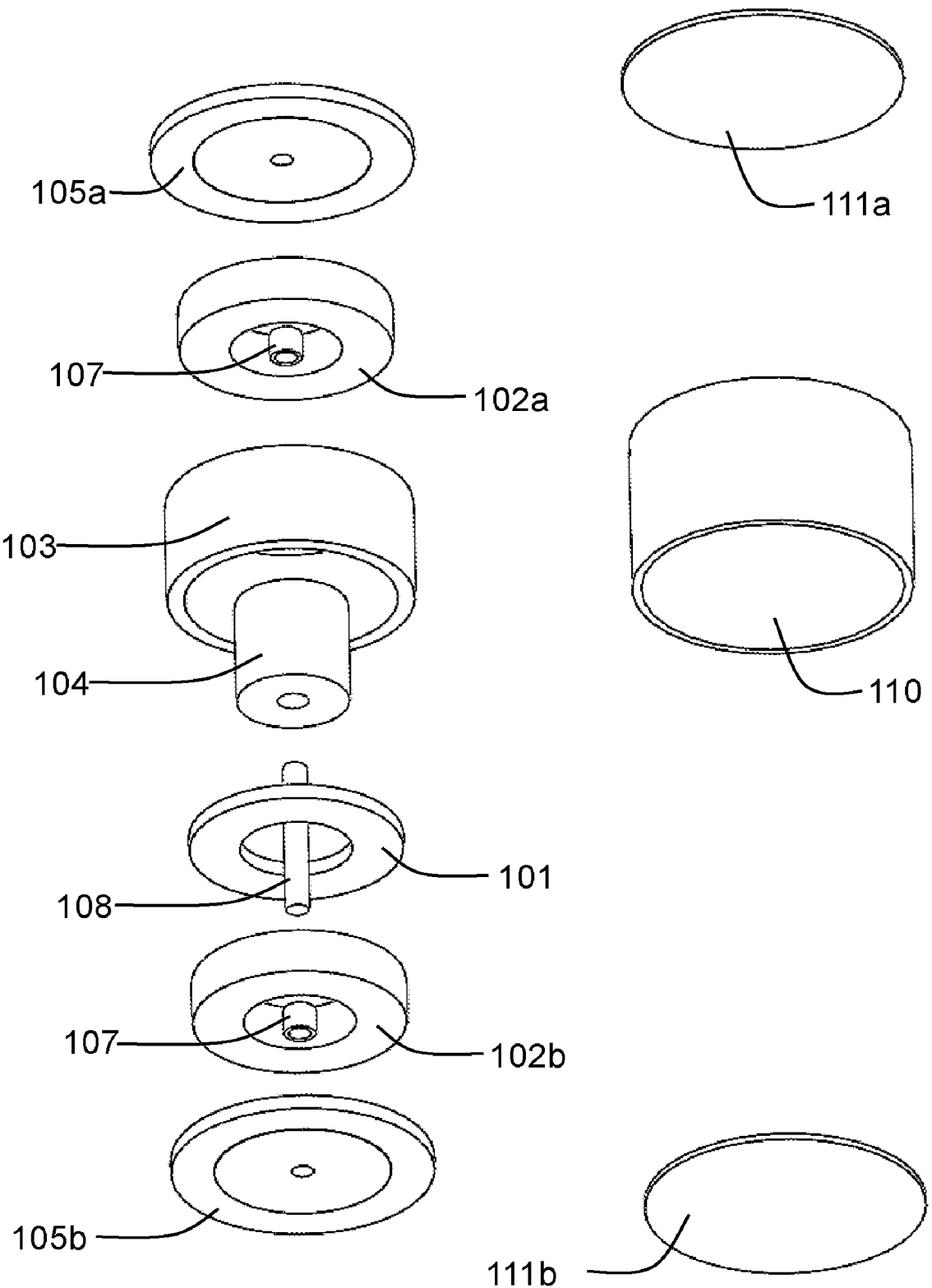
FIG. 1 is an exploded view of a first configuration of an electromagnetic actuator.

The invention provides electromagnetic actuators with bidirectional linear force output, without magnetic bias from current or permanent magnets. Systems and methods based on the electromagnetic actuators are also provided.

The actuators, systems, and methods of the invention may include two current-conducting drive coils, which drive magnetic flux across opposing axial gaps. One drive coil causes a pulling magnetic force across one gap, and the other drive coil causes pulling force in the opposite direction across the other gap. Magnetic flux sensors in annular slits in the flux returns measure the flux crossing the gaps, and allow calculation of the force in each gap.

Force output command signals may be transmitted to a controller, which is programmed to calculate a top gap force command and bottom gap force command in response to the force output command signal, using a crossover algorithm. The controller transmits signals to an amplifier to provide current to the drive coils of the electromagnetic actuators of the invention, and produce a force corresponding to the force output command, as measured by magnetic field sensors provided in the electromagnetic actuators. The control functions may be provided by a single component controller such as a Field Programmable Gate Array (FPGA), or by a system of discrete components (e.g., crossover controller, gap force controllers, squaring circuits, amplifiers).

There are two presently-preferred embodiments of the electromagnetic actuators of the present invention, though the invention is not limited to any particular embodiment. In the first embodiment, the electromagnetic actuator generates inertial forces by forced oscillation of a moving mass. This type of actuator is commonly known as a shaker. In the second embodiment, the electromagnetic actuator generates forces between a fixed base and an output shaft and is commonly known as a linear actuator.

Both preferred embodiments include a moving coil assembly consisting of inner and outer flux cylinders and a center flux return that is provided between and in contact with the inner and outer flux cylinders. Top and bottom drive coils are likewise located radially between and in contact with the flux cylinders, with the top drive coil being above the center flux return and the bottom drive coil being below. The flux cylinders, center flux return, and the drive coils are joined and move as a unit. Top and bottom axial air gaps separate the moveable unit from top and bottom stationary flux returns. Magnetic flux generated by the drive coils travels through the inner and outer flux cylinders and the center flux return and across the axial air gaps to the stationary flux returns which complete the flux loop. The top and bottom drive coils are essentially independent, with flux from the top drive coil crossing the top axial gap and flux from the bottom drive coil crossing the bottom axial gap.

The top and bottom stationary flux returns each include an annular slit that is narrow enough to not appreciably affect the reluctance of the drive coil flux path, and that is between the magnetic fringe fields of the inner and outer flux cylinders. Substantially all of the magnetic flux crossing the axial gaps therefore passes through the annular slits. A magnetic flux sensor, such as a Hall sensor, is embedded in the top and bottom annular slits and measures the flux density in the slits. The force produced in each axial gap is directly proportional to the square of the flux density measured in the associated stationary flux return's annular slit. The magnetic flux sensors therefore provide an accurate measurement of the force in the top and bottom axial gaps, regardless of the gap width.

The top axial gap and the bottom axial gap produce pull forces in opposite directions to produce the output force. Adopting the convention that the force in the top axial gap $F_t$ is always positive and force in the bottom axial gap is $F_b$ is always negative, the output force $F_o$ is $$F_o = F_t + F_b$$

A crossover controller receives an input of the commanded output force $F_{oc}$ and calculates the optimum top gap force command $F_{tc}$ and the bottom gap force command $F_{bc}$ to make $F_o$ equal to $F_{oc}$. The crossover controller sends gap force commands to top and bottom gap force controllers, as calculated by a crossover algorithm. The gap force controllers drive an amplifier to provide current to the drive coils to produce the commanded force in the gaps, as measured by the magnetic field sensors in the annular slits.

The preferred crossover algorithm for the crossover controller is based on defining a transition force level $F_c$ such that between $-F_c$ and $F_c$ both the top and bottom gaps are used to produce force and outside this range only one gap is used. The preferred crossover algorithm uses the following rules:

Rule 1: Output force more positive than $F_c$ is produced only by the top gap $$F_{oc} > F_c \to F_{tc} = F_{oc} \ \& \ F_{bc} = 0$$

Rule 2: Output force more negative than $-F_{oc}$ is produced only by the bottom gap $$F_{oc} < -F_c \to F_{bc} = F_{oc} \ \& \ F_{tc} = 0$$

Rule 3: The top gap force plus the bottom gap force equals the commanded output force $$F_{oc} = F_{tc} + F_{bc}$$

Rule 4: The rate of change of the gap force command is equal to the rate of change of the output force command at transition force level $F_c$ or $-F_c$ $$F_{oc} = F_c \to \frac{dF_{tc}}{dt} = \frac{dF_{oc}}{dt},$$

$$F_{oc} = -F_t \to \frac{dF_{bc}}{dt} = \frac{dF_{oc}}{dt},$$

Rule 5: The rate of change of the gap force command is zero when the gap force command is zero $$F_{tc} = 0 \to \frac{dF_{tc}}{dt} = 0, \ F_{bc} = 0 \to \frac{dF_{bc}}{dt} = 0$$

Crossover algorithm Rules 1 and 2 ensure efficient operation of the electromagnetic actuator by limiting the gap force commands to the minimum required for a smooth transition. Rule 3 ensures the ordered force is produced. Rule 4 ensures the transition is smooth by matching the derivatives at the transition points. Rule 5 limits the amplifier voltage required.

Any algorithm that meets the five crossover rules may be used.

One presently-preferred crossover algorithm is as follows:

$$F_{oc} > F_c \to F_{tc} = F_{oc} \ \& \ F_{bc} = 0$$

$$F_{oc} < -F_c \to F_{bc} = F_{oc} \ \& \ F_{tc} = 0$$

$$-F_t \le F_{oc} \le F_c \to F_{tc} = \frac{(F_{oc} + F_c)^2}{4F_c} \ \& \ F_{bc} = \frac{-(F_{oc} - F_c)^2}{4 F_c}$$

This presently-preferred crossover algorithm satisfies Rules 1 and 2 by definition. To verify Rule 3, note the following:

$$F_{tc} + F_{bc} = \frac{(F_{oc} + F_c)^2}{4F_c} + \frac{-(F_{oc} - F_c)^2}{4F_c} = \frac{2F_{oc}F_c + 2F_{oc}F_c}{4F_c} = F_{oc}$$

To verify Rules 4 and 5, first assume that the command output force is a single tone with arbitrary angular frequency $\omega$ and peak value $F_p$. This command output force can be written as $F_{oc} = F_p \sin(\omega t)$. Substituting into the top gap crossover algorithm for $F_c$ and taking the derivative with respect to t gives:

$$\frac{dF_{tc}}{dt} = \frac{d}{dt} \frac{(F_p \sin(\omega t) + F_c)^2}{4F_c} = \frac{\omega F_p (F_p \sin(\omega t) + F_c) \cos(\omega t)}{2F_c}$$

To test Rule 4, substitute $F_p \sin(\omega t) = F_c$:

$$\frac{dF_{tc}}{dt} = \frac{\omega F_p (-F_c + F_c) \cos(\omega t)}{2F_c} = F_p \omega \cos(\omega t)$$

This is equal to the derivative of $F_p \sin(\omega t)$, so Rule 4 is verified for $F_{tc}$.

To test Rule 5, note that $F_{tc} = 0$ when $F_p \sin(\omega t) = -F_c$. Performing that substitution:

$$\frac{dF_{tc}}{dt} = \frac{\omega F_p (-F_c + F_c) \cos(\omega t)}{2F_c} = 0$$

Therefore, Rule 5 is verified for $F_{tc}$.

Verification of Rules 4 and 5 is similar for $F_{bc}$.

Extension from a single tone to arbitrary broadband signal is accomplished by noting that $\omega$ is arbitrary and all operations performed in the above verification are linear. Therefore the verification applies to any frequency and any combination of frequencies.

The selection of transition force level $F_c$ is made based on a trade between actuator efficiency and amplifier voltage requirements. A low value of $F_c$ increases actuator efficiency by reducing the gap force commands, but a low value of $F_c$ increases the voltage the amplifier must produce. To derive this relationship, note that the force across a gap is proportional to the square of the current through the drive coil producing the magnetic flux in the gap for a fixed gap width. If the current through the top drive coil is $I_t$, then the force in the top gap will be $F_t = k_{tg} I_t^2$, where $k_{tg}$ is a proportionality constant that depends on the gap width. In the transition region, when $I_t$ is adjusted to make $F_t = F_{tc}$, $$F_{tc} = \frac{(F_{oc} + F_c)^2}{4F_c} = k_{tg} I_t^2$$

Solving for $I_t$:

$$I_t = \frac{F_{oc} + F_c}{2\sqrt{k_{tg} F_c}}$$

The electrical impedance of the drive coils is primarily inductive. Assuming the inductance of the top drive coil for a given gap width is $L_{tg}$, then the voltage $V_t$ required to change current flow $I_t$ is $$V_t = L_{tg} \frac{dI_t}{dt} = L_{tg} \frac{d}{dt} \left[ \frac{F_{oc} + F_c}{2\sqrt{k_{tg} F_c}} \right] = \left[ \frac{L_{tg}}{2\sqrt{k_{tg} F_c}} \right] \frac{dF_c}{dt}$$

The required voltage is directly proportional to the rate of change of the commanded output force $F_{oc}$ and inversely proportional to the square root of the transition force level $F_c$.

In a first embodiment, the flux cylinders, center flux return, and the drive coils are solidly connected and form the moveable inertial mass of the actuator. The inertial mass is supported radially by bearings and can move axially on a shaft with respect to the top and bottom stationary flux returns and support structure. This movement generates an inertial force in the mass and an equal and opposite force on the support structure. The top and bottom air gaps between the moving inertial mass and the stationary flux returns accommodate axial motion. I, should be appreciated that springs are not required to restore the position of the coil assembly because there is no negative spring stiffness attracting it to the top and bottom stationary flux returns and gravity effects may be counteracted by the forces produced by the drive coils in the top and bottom air gaps.

In a second embodiment, the flux cylinders, center flux return, and the drive coils are again solidly connected and move together, but they are attached to a shaft. The shaft is supported radially by bearings and can move axially with respect to the top and bottom stationary flux returns and support structure. The top and bottom air gaps between the moving inertial mass and the stationary flux returns accommodate axial motion. The shaft motion may be used to perform useful work in a linear controlled manner.

These and other aspects of the invention are further described by reference to the accompanying figures.

Figure 2:
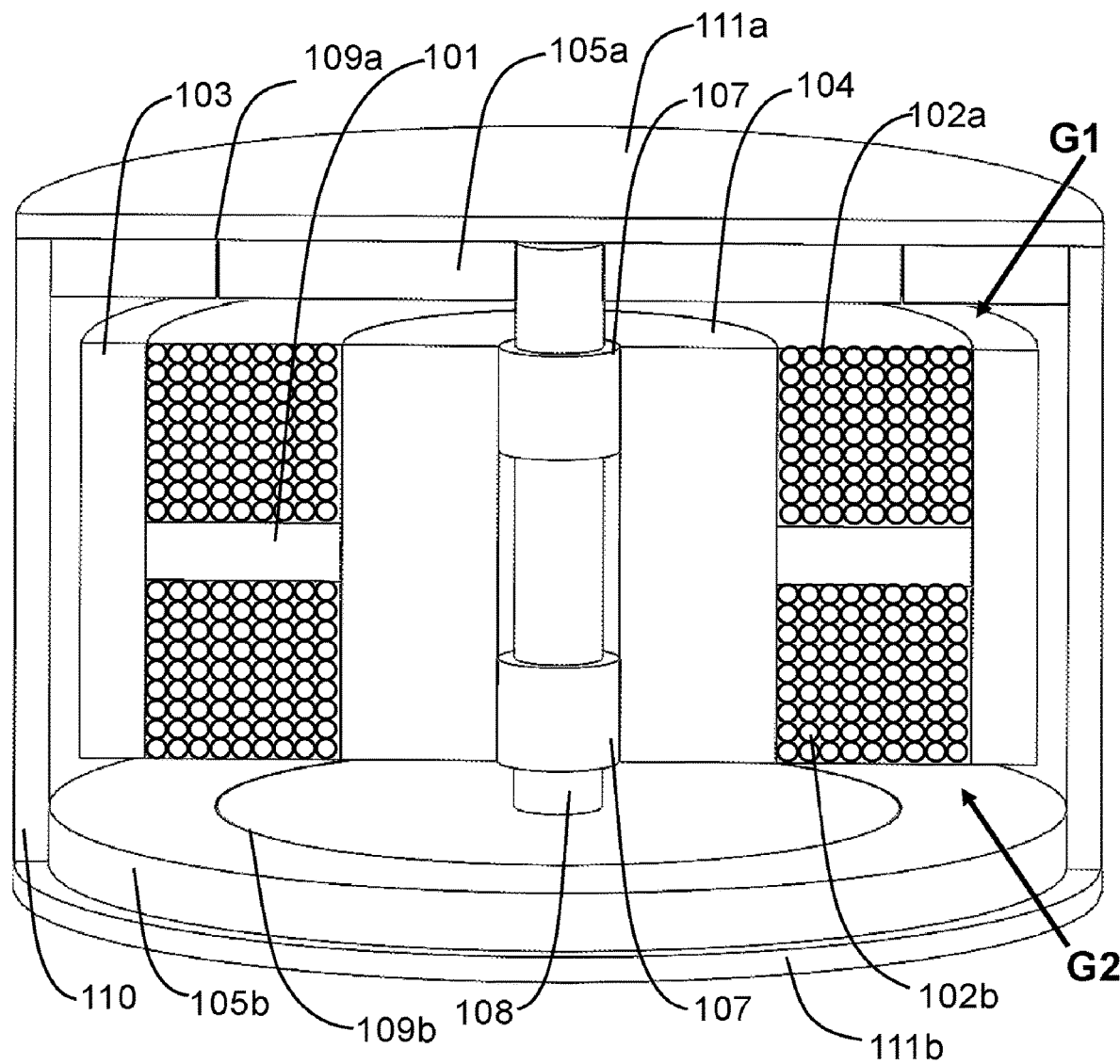
FIG. 2 is a cut away view of the first configuration.

FIG. 1 and FIG. 2 are two views of the first embodiment of the present invention. Inner flux cylinder 104 and outer flux cylinder 103 are joined by center flux return 101, which is radially between and in contact with the cylinders. Top drive coil 102a and bottom drive coil 102b are likewise between inner and outer flux cylinders 104 and 103 and on each side of center flux return 101. Flux cylinders 104 and 103, center flux return 101, and drive coils 102a and 102b are joined to form a coil assembly. The coil assembly moves as a unit, sliding along shaft 108, forming the moveable inertial mass of the actuator.

The inertial mass formed by flux cylinders 104 and 103, center flux return 101, and drive coils 102a and 102b is slidably mounted by linear bearings 107 on fixed shaft 108, which remains stationary within the electromagnetic actuator. Shaft 108 also connects the top support plate 111a and bottom support plate 111b.

Outer casing 110, top support plate 111a and bottom support plate 111b form the support structure for the actuator. Top support plate 111a and bottom support plate 111b are attached to and support top stationary flux return 105a and bottom stationary flux return 105b, respectively. Outer casing 110 is attached to top support plate 111a and bottom support plate 111b and maintains their alignment and position.

As shown in FIG. 2, top stationary flux return 105a and bottom top stationary flux return 105b are separated from the inertial mass by top air gap G1 and bottom air gap G2. Top stationary flux return 105a includes an annular slit 109a. A magnetic flux sensor (not shown), which may be a Hall sensor, is embedded in annular slit 109a. Bottom stationary flux return 105b likewise includes an annular slit 109b and an embedded magnetic flux sensor (not shown). For example, suitable Hall sensors with a thickness of about 1 millimeter are known.

Annular slits 109a and 109b in top stationary flux return 105a and bottom stationary flux return 105b are preferably wide enough to permit insertion of the magnetic flux sensor, and narrow enough to not appreciably affect the reluctance of the flux path (e.g., about 1.5 mm or less). In some aspects of the invention, annular slits having a width of about 1.5 mm or less are preferred, as a slit having this width will typically increase reluctance by about 10% or less, preferably by about 5% or less, and more preferably by about 2% or less. The increase in reluctance is also dependent on the width of the top air gap G1 and the bottom air gap G2, where wider air gaps result in lower increases in reluctance for a given annular slit width. Air gap widths of from about 3 mm to about 12 mm are preferred in some aspects of the invention, though it is understood that the width of the top and bottom air gaps also depends on the overall size of the apparatus.

Inner and outer flux cylinders 104 and 103 and top and bottom stationary flux returns 105a and 105b are preferably made of electrical steel, which has a silicon content of up to 6.5% (preferably about 3% silicon), and optionally manganese and/or aluminum content of up to 0.5%. Electrical steel provides high permeability and low hysteresis as compared to conventional steel alloys. These components may be composed of thin laminations to reduce eddy currents.

Outer casing 110, top and bottom supports 111a and 111b, and shaft 108 are preferably made of nonferrous material to prevent a flux path bypassing gaps G1 and G2. Linear bearings 107 are preferably low friction linear ball bearings to prevent inertial force distortion due to stiction. Drive coils 102a and 102b are preferably wound from insulated copper wire manufactured for drive coils, known as magnet wire.

Figure 3:
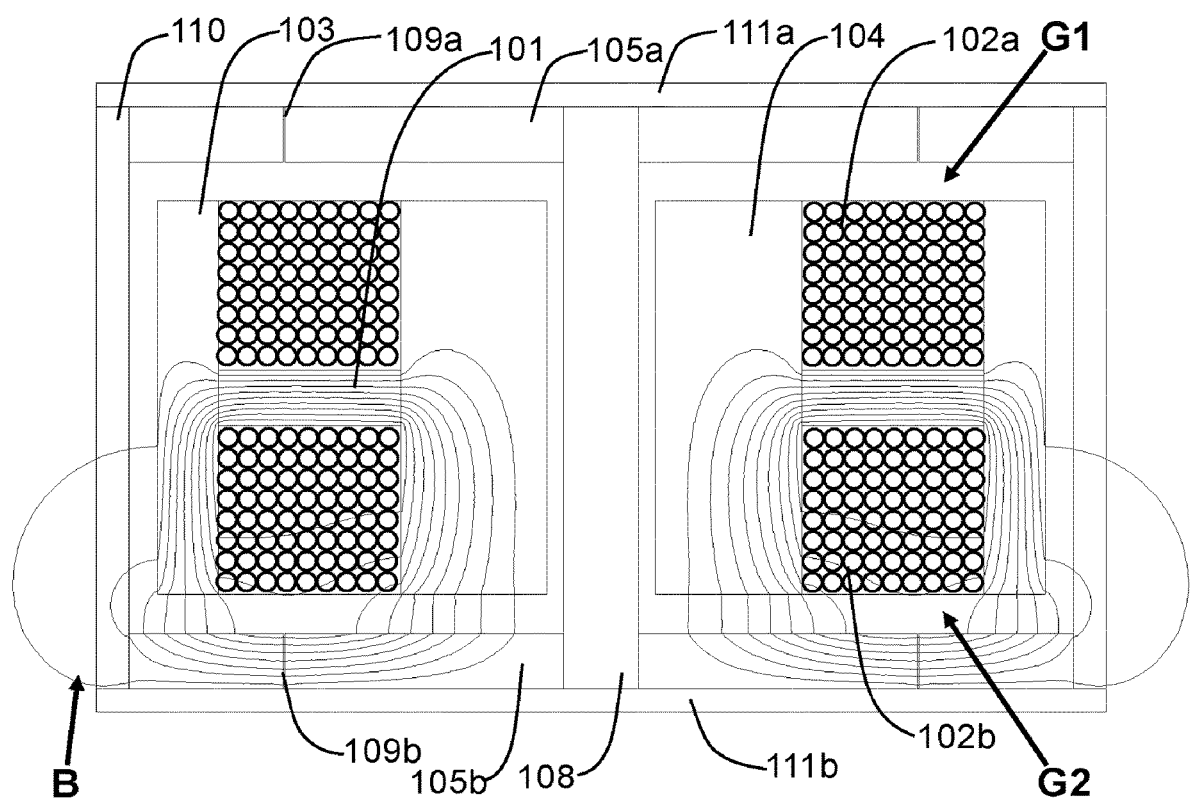
FIG. 3 shows the calculated magnetic flux lines from the bottom drive coil only for the first embodiment of the present invention.

FIG. 3 shows the calculated magnetic flux lines B when current is flowing through drive coil 102b only with the inertial mass in the neutral position. A portion of the magnetic flux lines B pass from inner flux cylinder 104 to outer flux cylinder 103 and back to inner flux cylinder 104 to complete a flux loop. A greater portion of the magnetic flux lines B pass from inner flux cylinder 104 across gap G2, through stationary flux return 105b, back across gap G2, to outer flux cylinder 103 and back to inner flux cylinder 104 to complete a flux loop. The force across gap G2 is proportional to the square of the total flux crossing the gap regardless of the path it takes. Note that annular slit 109b is preferentially located in a position which is between the magnetic field lines from the inner and outer flux cylinders 104 and 103 and that substantially all of the magnetic flux lines which cross gap G2 also cross annular slit 109b.

Figure 4:
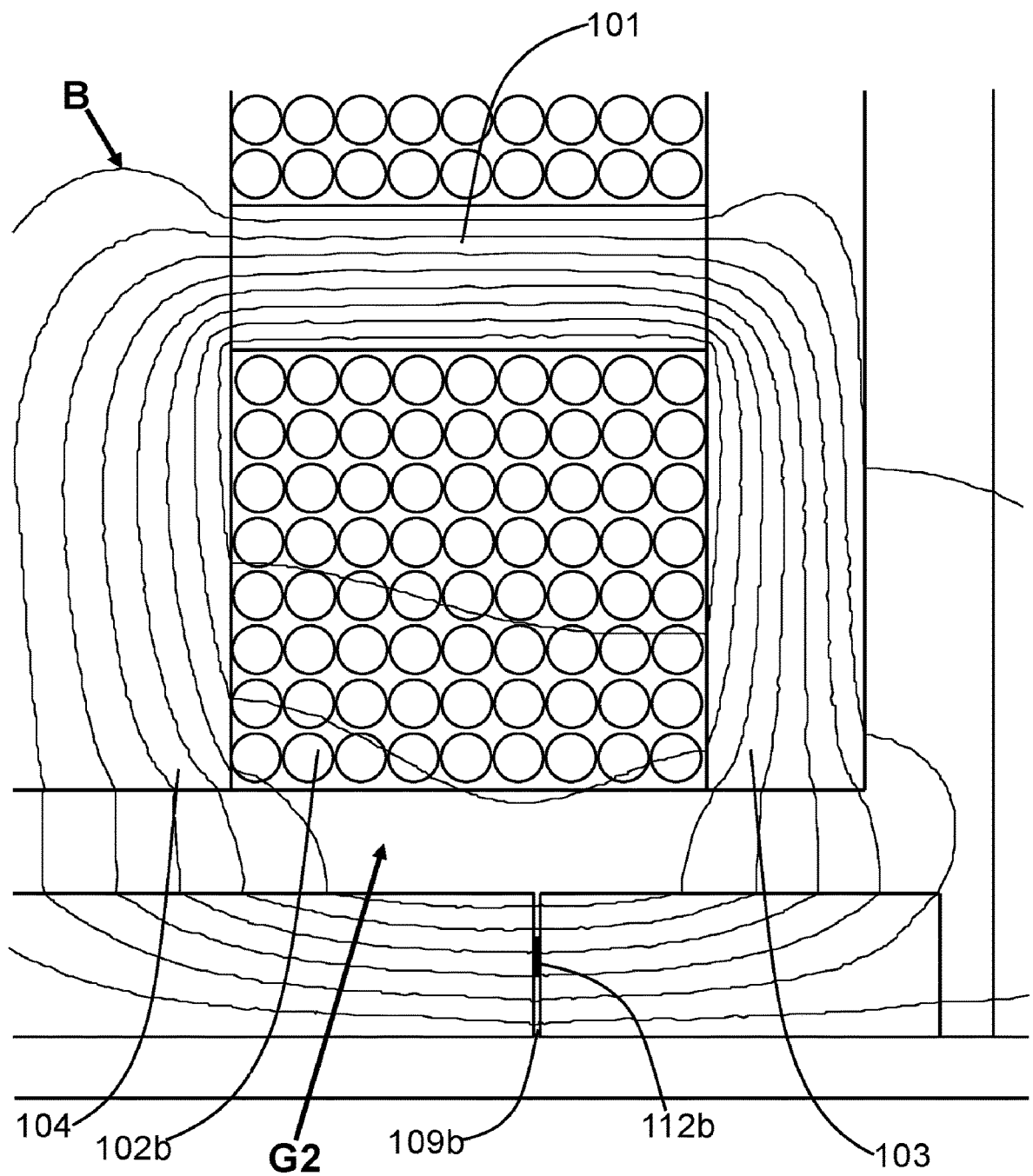
FIG. 4 is an enlarged view of a portion of FIG. 3, showing the calculated magnetic flux lines passing through the annular slits.

FIG. 4 is an enlarged view of a portion of FIG. 3, showing the same calculated magnetic flux lines. Shown here is bottom magnetic flux sensor 112b, which is embedded in annular slit 109b, and samples the flux passing through the slit. The force produced in axial gap G2 is directly proportional to the square of the flux density measured by magnetic flux sensor 112b regardless of the width of axial gap G2.

Although not shown, the top magnetic flux sensor (not shown) is embedded in top annular slit 109a (see FIG. 3), and samples the flux passing through the slit. The force produced in axial gap G1 is directly proportional to the square of the flux density measured by the top magnetic flux sensor, regardless of the width of axial gap G1.

Figure 5:
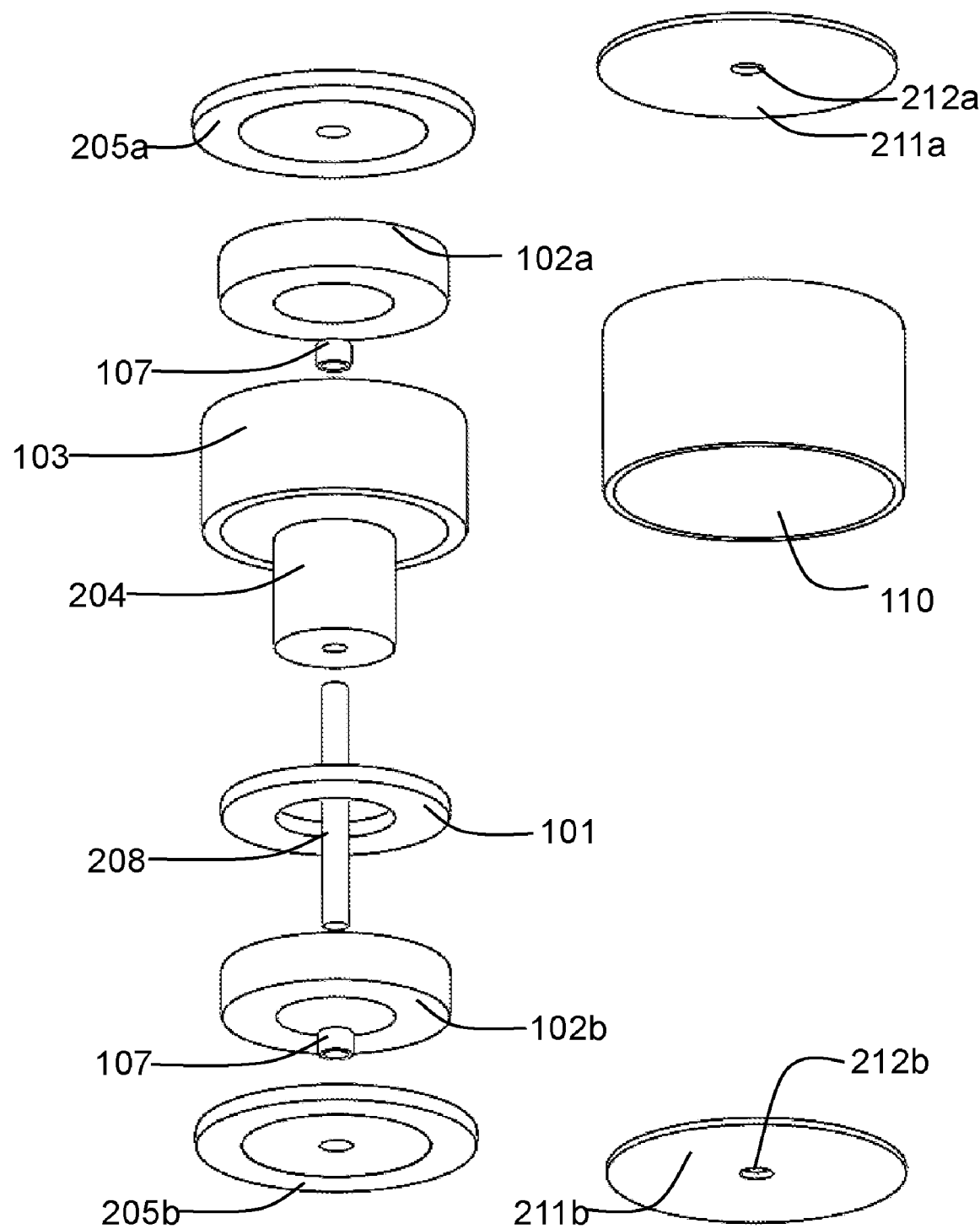
FIG. 5 is an exploded view of the second configuration of an electromagnetic actuator.
Figure 6:
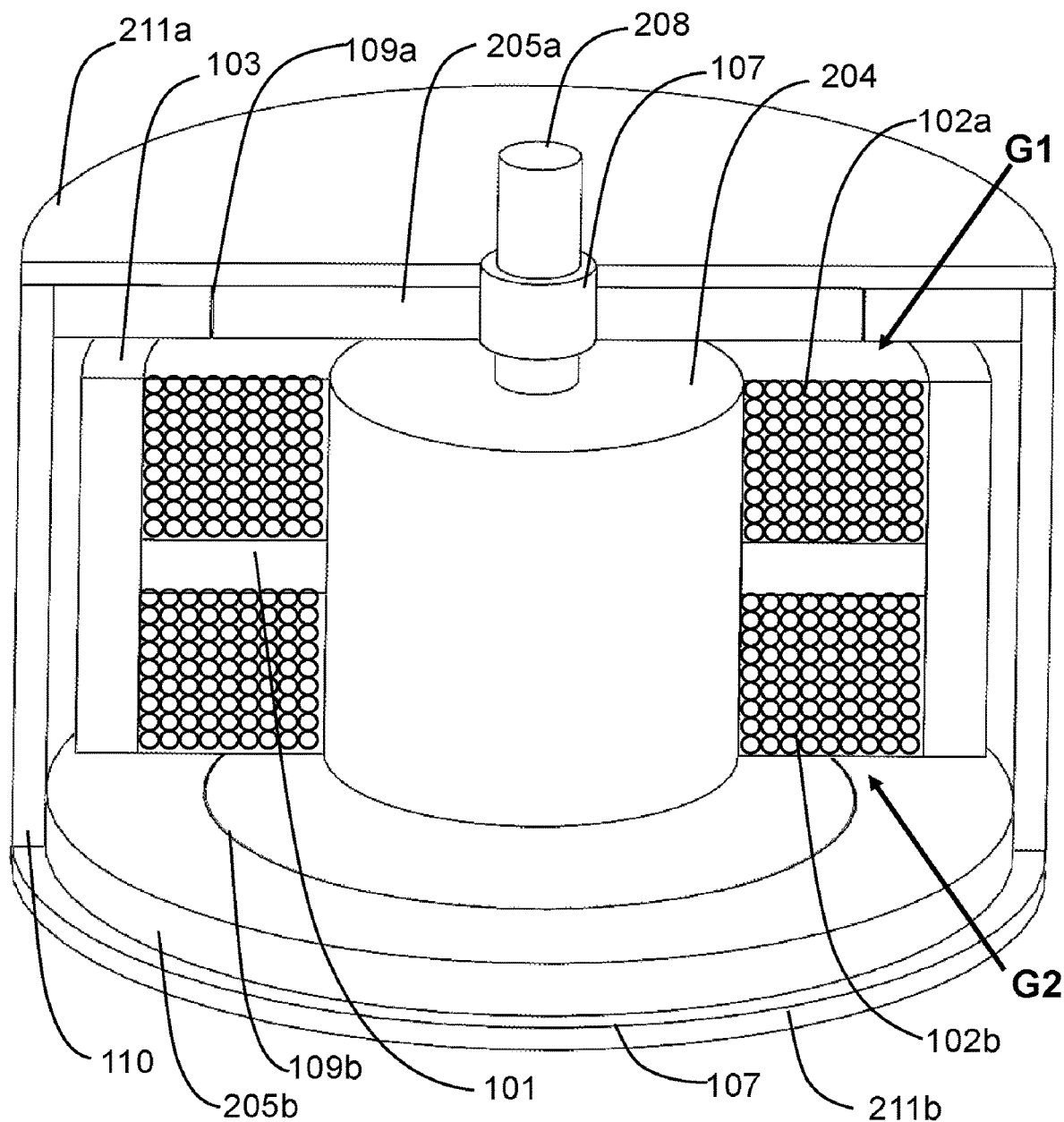
FIG. 6 is a cut away view of the second configuration.

FIG. 5 and FIG. 6 are two views of the second embodiment of the present invention. Inner flux cylinder 204 and outer flux cylinder 103 are joined by center flux return 101, which is radially between and in contact with the cylinders. Top drive coil 102a and bottom drive coil 102b are likewise between inner and outer flux cylinders 204 and 103 and on each side of center flux return 101. Inner flux cylinder 204 is joined to moveable shaft 208. Shaft 208 is slidably supported by linear bearings 107, which allow it to move axially. Flux cylinders 204 and 103, center flux return 101, and drive coils 102a and 102b are joined to form a coil assembly. The coil assembly moves as a unit affixed to shaft 208, forming the moveable inertial mass of the actuator.

Outer casing 110, top support plate 211a and bottom support plate 211b form the support structure for the actuator. Top support plate 211a and bottom support plate 211b are attached to and support top stationary flux support 205a and bottom stationary flux support 205b, respectively. Outer casing 110 is attached to top support plate 211a and bottom support plate 211b and maintains their alignment and position. Top support plate 211a and bottom support plate 211b have openings 212a and 212b provided in the centers thereof, which have a diameter sufficient to permit moveable shaft 208 to extend from the top and bottom support plates during movement.

As shown in FIG. 6, top stationary flux return 205a and bottom top stationary flux return 205b are separated from the moving portions by top air gap G1 and bottom air gap G2. Top stationary flux return 205a includes an annular slit 109a. A magnetic flux sensor (not shown), which may be a Hall sensor, is embedded in annular slit 109a. Bottom stationary flux return 205b likewise includes an annular slit 109b and an embedded magnetic flux sensor (not shown). For example, suitable Hall sensors with a thickness of about 1 millimeter are known.

Annular slits 109a and 109b in top stationary flux return 205a and bottom stationary flux return 205b are preferably wide enough to permit insertion of the magnetic flux sensor, and narrow enough to not appreciably affect the reluctance of the flux path (e.g., about 1.5 mm or less). In some aspects of the invention, annular slits having a width of about 1.5 mm or less are preferred, as a slit having this width will typically increase reluctance by about 10% or less, preferably by about 5% or less, and more preferably by about 2% or less. The increase in reluctance is also dependent on the width of the top air gap G1 and the bottom air gap G2, where wider air gaps result in lower increases in reluctance for a given annular slit width. Air gap widths of from about 3 mm to about 12 mm are preferred in some aspects of the invention, though it is understood that the width of the top and bottom air gaps also depends on the overall size of the apparatus.

Inner and outer flux cylinders 204 and 103 and top and bottom stationary flux returns 205a and 205b are preferably made of electrical steel, which has a silicon content of up to 6.5% (preferably about 3% silicon), and optionally manganese and/or aluminum content of up to 0.5%. Electrical steel provides high permeability and low hysteresis as compared to conventional steel alloys. These components may be composed of thin laminations to reduce eddy currents.

Outer casing 110, top and bottom supports 211a and 211b, and shaft 208 are preferably made of nonferrous material to prevent a flux path bypassing gaps G1 and G2. Linear bearings 107 are preferably low friction linear ball bearings to prevent inertial force distortion due to stiction. Drive coils 102a and 102b are preferably wound from insulated copper wire manufactured for drive coils, known as magnet wire.

Figure 7:
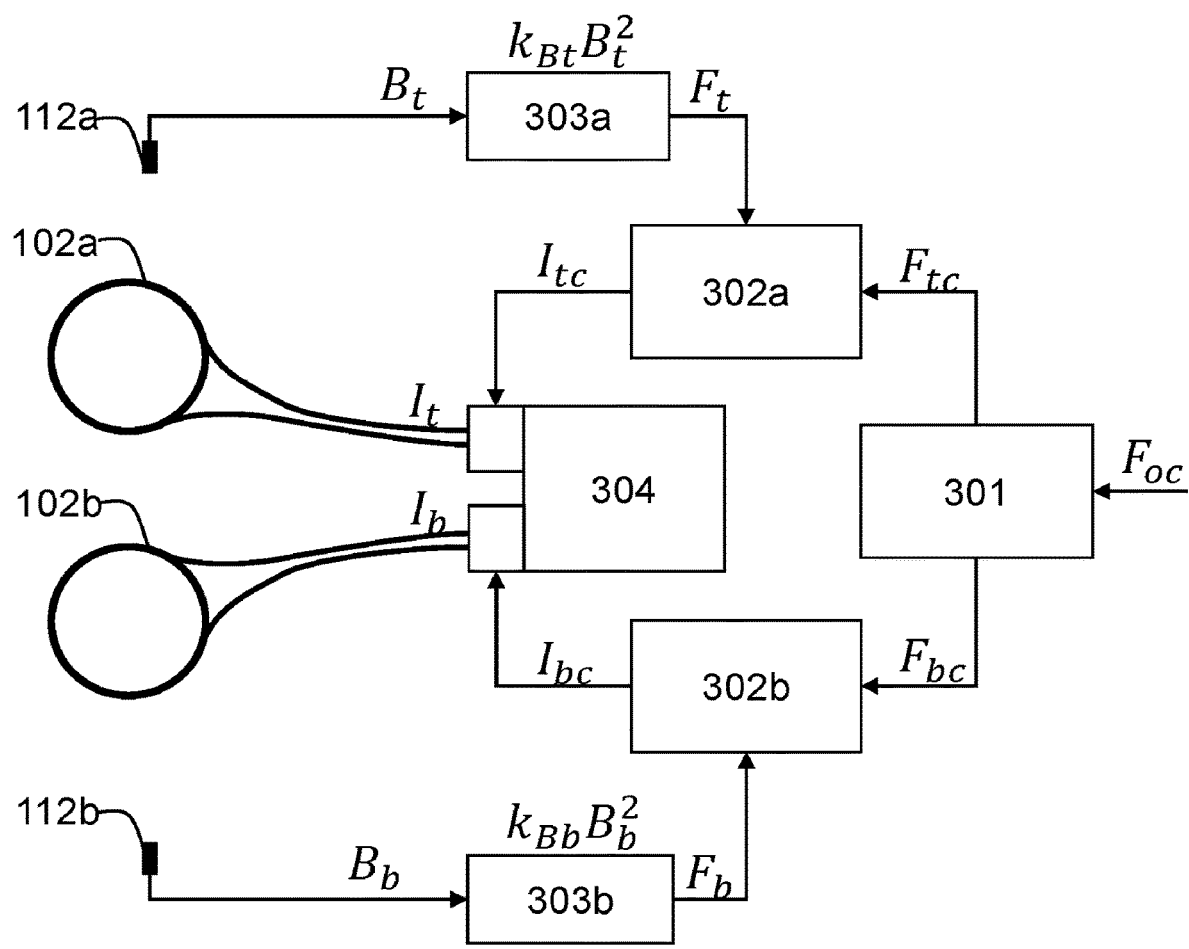
FIG. 7 is a diagram of the force linearization and control system.

FIG. 7 is a diagram of the force linearization and control system of the present invention. The crossover controller 301 receives an input of the commanded output force $F_{oc}$ and calculates the top and bottom gap force commands $F_{tc}$ and $F_{bc}$ as calculated by a crossover algorithm. The crossover controller sends gap force commands to top and bottom gap force controllers 302a and 302b. Top and bottom flux measurements $B_t$ and $B_b$ from magnetic flux sensors 112a and 112b go to squaring circuits 303a and 303b, which compute the top and bottom gap forces $F_t$ and $F_b$ using proportionality constants $k_{Bt}$ and $k_{Bb}$. The gap force controllers 302a and 302b compare measured forces $F_t$ and $F_b$ to the gap force commands $F_{tc}$ and $F_{bc}$, and send current commands $I_{tc}$ and $I_{bc}$ to an amplifier 304 which produces current $I_t$ and $I_b$ through drive coils 102a and 102b. The amplifier is preferably a current amplifier. It should be noted that the force linearization and control system may be implemented as discrete components as shown in FIG. 7, or the control functions may be implemented in a single component such as a Field Programmable Gate Array (FPGA), or other control module. The gap force controllers 302a and 302b may use feedback or feed forward methods known to those of ordinary skill in the art and available in FPGA libraries.

Figure 8:
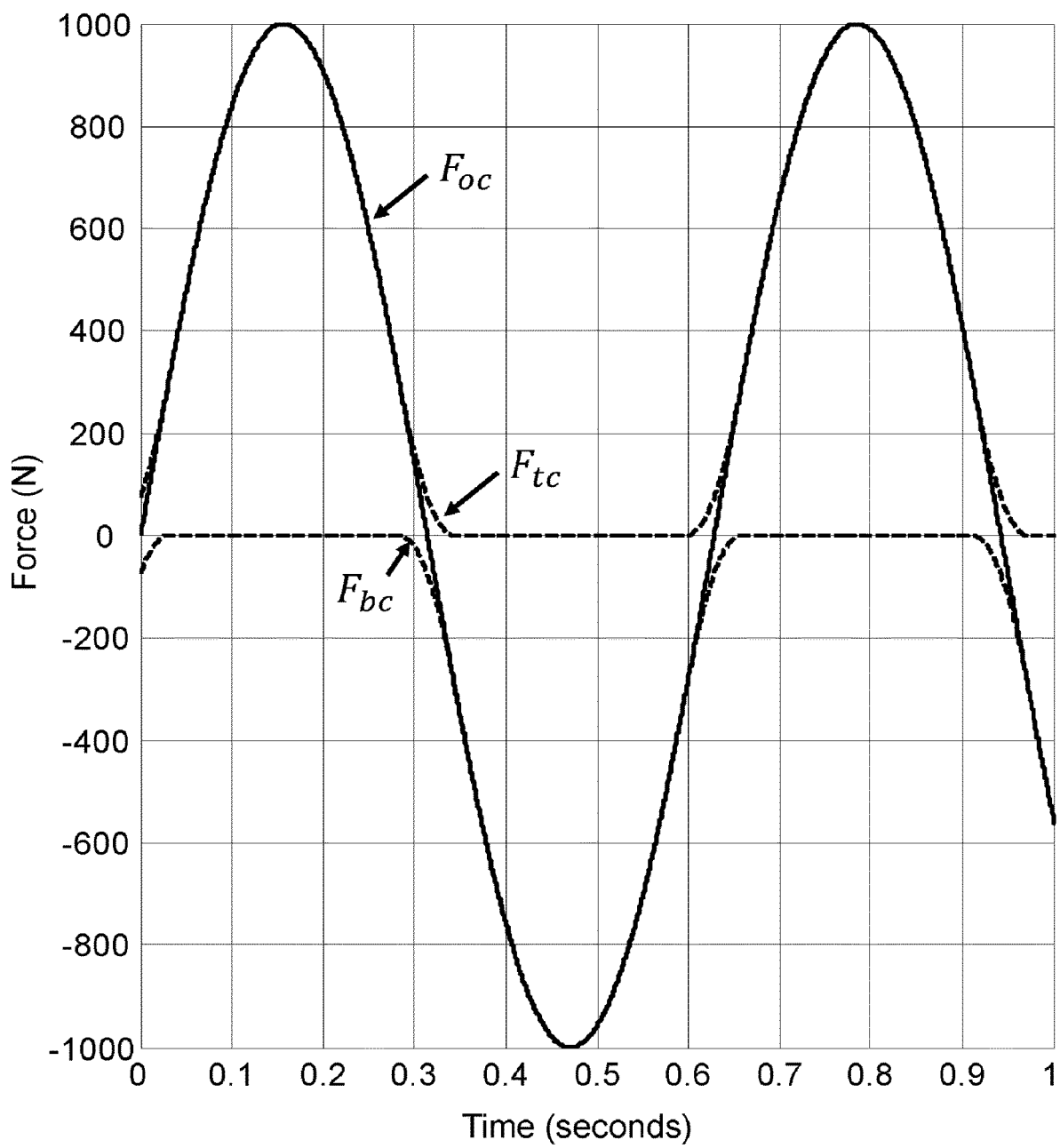
FIG. 8 is a time plot of the commanded output force and the top and bottom gap force commands for an example single frequency as determined by the crossover algorithm.

FIG. 8 is a plot of the inputs and outputs of the crossover controller 301 as calculated by the preferred crossover algorithm for an example single frequency. The solid line is the commanded output force $F_{oc}$ and the dashed lines are the top and bottom gap force commands $F_{tc}$ and $F_{bc}$. Note that $F_{tc}$ is always greater than or equal to zero, and $F_{bc}$ is always less than or equal to zero.

Figure 9:
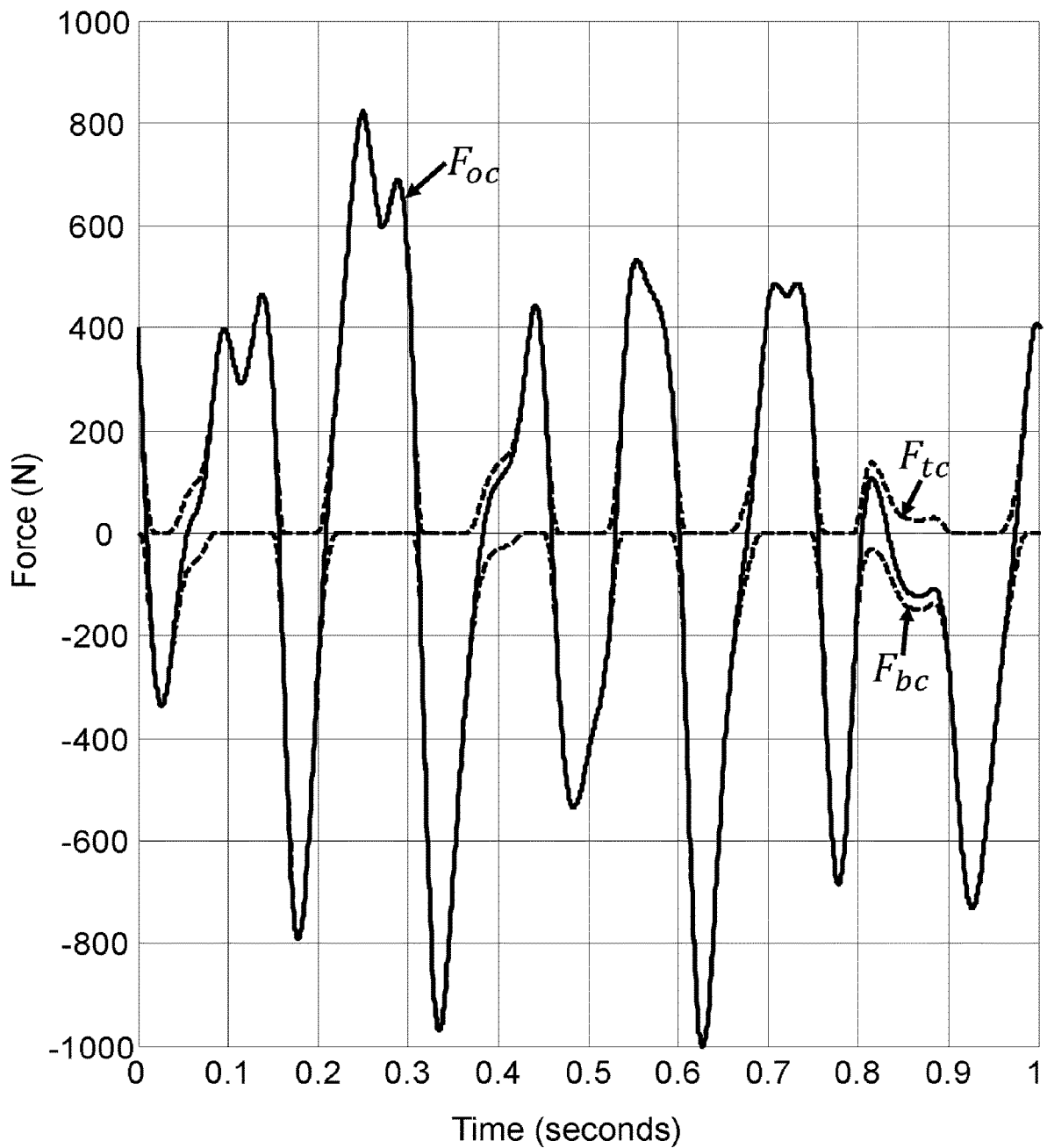
FIG. 9 is a time plot of the commanded output force and the top and bottom gap force commands for an example wideband signal as determined by the crossover algorithm.

FIG. 9 is a plot of the inputs and outputs of the crossover controller 301 as calculated by the preferred crossover algorithm for an example broadband input. The solid line is the commanded output force Fa and the dashed lines are the top and bottom gap force commands $F_{tc}$ and $F_{bc}$. Note that $F_{tc}$ is always greater than or equal to zero, and $F_{bc}$ is always less than or equal to zero.

The electromagnetic actuators and force linearization and control system of the invention may be used in methods for producing bidirectional linear force output from electromagnetic actuators. The methods beneficially avoid magnetic bias created by electrical current or permanent magnets. The methods are carried out by providing an electrodynamic actuator that includes top and bottom magnetic flux sensors (such as Hall sensors) that are positioned to measure magnetic flux crossing respective top and bottom axial air gaps separating top and bottom stationary flux returns from the inertial mass of the electrodynamic actuator.

A control module receives the measured magnetic flux from the top and bottom magnetic flux sensors, which is squared, and multiplied by a proportionality constant to obtain an estimate of force produced across the top and bottom axial air gaps. The control module calculates top and bottom axial air gap force commands according to a crossover algorithm. The control module controls the current directed through top and bottom electrical coils such that the estimated axial force produced across the top and bottom axial air gaps is equal to the top and bottom axial air gap force commands.

The crossover algorithms used in the control module and/or methods define a transition force level, $F_c$, for a commanded output force. Top and bottom axial air gap force commands may be calculated such that the sum of the top and bottom axial air gap forces is equal to the commanded output force (Rule 3, above).

In some aspects of the invention, the control module and/or methods calculate the sum of the top and bottom axial air gap forces (using Rules 1, 2, 4, and 5, above): commanded output force more positive than $F_c$ is produced only by the top axial air gap (Rule 1); commanded output force more negative than $-F_c$ is produced only by the bottom axial air gap (Rule 2); rate of change of the axial air gap force command is equal to rate of change of the commanded output force at transition force level $F_c$ (Rule 4); and rate of change of the axial air gap force command is zero when a sum of top and bottom axial air gap force commands is zero (Rule 5).

It will, of course, be appreciated that the above description has been given by way of example only, and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed:

1. A force linearization and control system, comprising:
   a crossover controller receiving commanded output force as input and producing top and bottom gap force commands;
   top and bottom squaring circuits receiving inputs from the respective top and bottom magnetic flux sensors and producing calculated top and bottom force estimates;
   top and bottom gap force controllers receiving calculated top and bottom gap force estimates from the respective top and bottom squaring circuits and receiving top or bottom gap force commands from the crossover controller and producing top and bottom current commands; and
   an amplifier receiving top and bottom current commands from the top and bottom gap force controllers and producing corresponding electrical currents in the respective top and bottom electrical coils.

2. A method for producing bidirectional linear force output from an electromagnetic actuator without magnetic bias from current or permanent magnets, comprising:
   providing an electrodynamic actuator with top and bottom magnetic flux sensors positioned to measure magnetic flux crossing respective top and bottom axial air gaps;
   squaring the measured magnetic flux from the top and bottom magnetic flux sensors and multiplying by a proportionality constant to obtain an estimate of force produced across the top and bottom axial air gaps;
   calculating top and bottom axial air gap force commands according to a crossover algorithm; and
   controlling current through top and bottom electrical coils, causing the estimated axial force produced across the top and bottom axial air gaps to be equal to the top and bottom axial air gap force commands.

3. The method of claim 2, the crossover algorithm comprising:
   defining a transition force level, Fc, for a commanded output force;
   calculating top and bottom axial air gap force commands such that the sum of the top and bottom axial air gap forces is equal to the commanded output force.

4. The method of claim 3, wherein the sum of the top and bottom axial air gap forces is subject to the following rules:
   a) commanded output force more positive than Fc is produced only by the top axial air gap;
   b) commanded output force more negative than –Fc is produced only by the bottom axial air gap;
   c) rate of change of the axial air gap force command is equal to rate of change of the commanded output force at transition force level Fc; and
   d) rate of change of the axial air gap force command is zero when a sum of top and bottom axial air gap force commands is zero.

5. The method of claim 3, wherein the sum of the top and bottom axial air gap forces is subject to the following rules:
   a) commanded output force more positive than Fc is produced by the top axial air gap;
   b) commanded output force more negative than –Fc is produced by the bottom axial air gap;
   c) rate of change of the axial air gap force command is equal to rate of change of the commanded output force at transition force level Fc; and
   d) rate of change of the axial air gap force command is zero when a sum of top and bottom axial air gap force commands is zero.

* * * * *